June 22, 1926.
N. HUBBARD ET AL
ATOMIZER OR SPRAYING DEVICE
Filed June 9, 1920    2 Sheets-Sheet 1
1,590,029
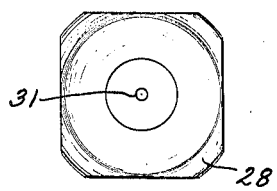
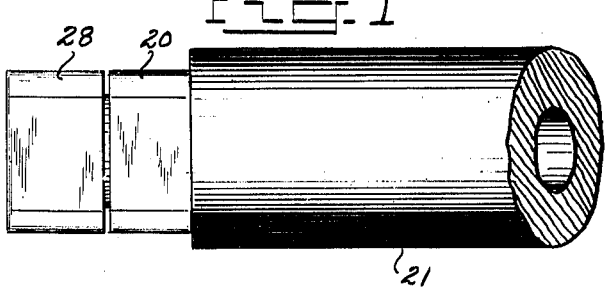
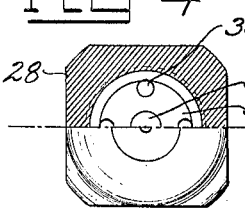
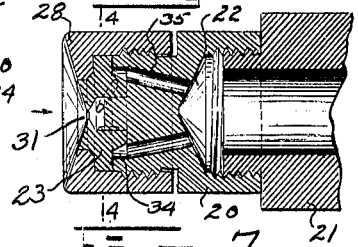
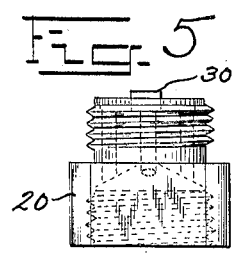
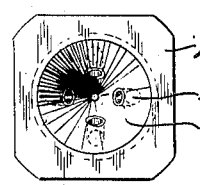
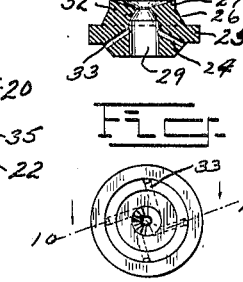
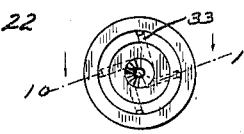
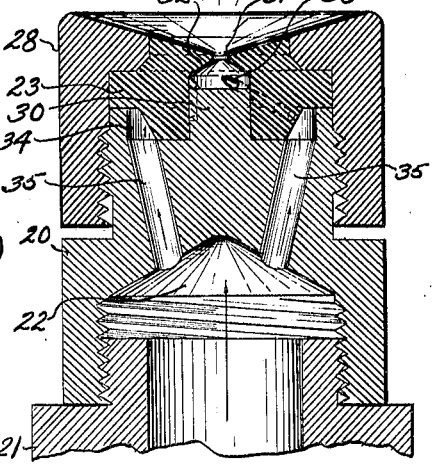
INVENTORS
Norman Hubbard
Thomas B Stillman
BY
Gifford & Bull
ATTORNEYS.

June 22, 1926.
N. HUBBARD ET AL
ATOMIZER OR SPRAYING DEVICE
Filed June 9, 1920   2 Sheets-Sheet 2
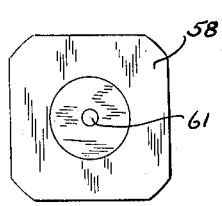
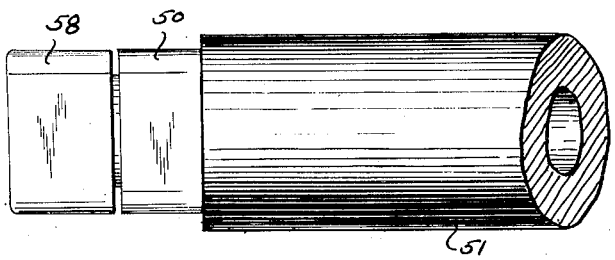
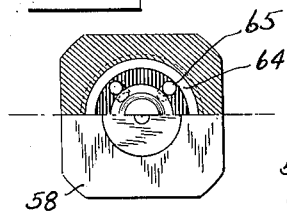
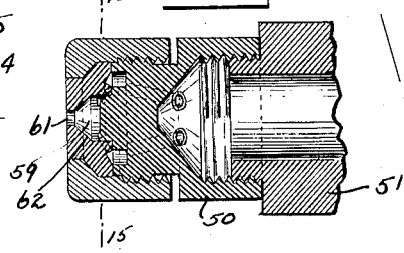
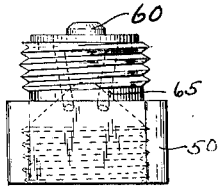
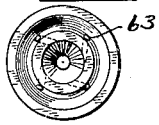
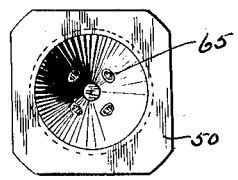
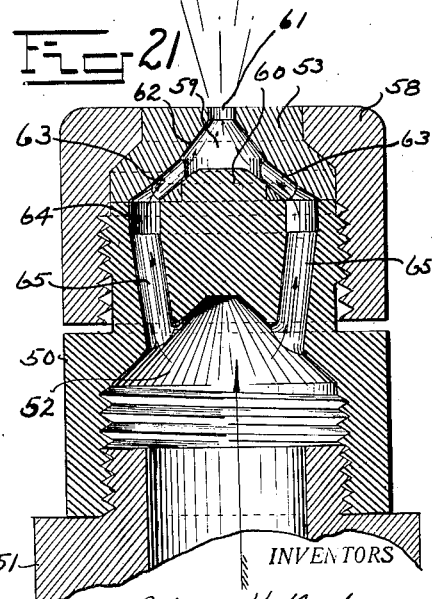

Patented June 22, 1926.

1,590,029

UNITED STATES PATENT OFFICE.

NORMAN HUBBARD, OF ELIZABETH, AND THOMAS B. STILLMAN, OF HOBOKEN, NEW JERSEY, ASSIGNORS TO THE BABCOCK & WILCOX COMPANY, OF BAYONNE, NEW JERSEY, A CORPORATION OF NEW JERSEY.

ATOMIZER OR SPRAYING DEVICE.

Application filed June 9, 1920. Serial No. 387,621.

This invention relates particularly to improvements in atomizers or spraying devices, and more particularly for such devices when used for spraying an atomizing fuel oil, whereby the oil is atomized and injected into the combustion chamber of a furnace, in the form of spray, by means of mechanical action induced by pressure.

One of the objects of our invention is to provide a spraying device in which the orifice and the ducts leading to it are all formed in the same member to obviate any possibility of slight shifts in the relative positions of the parts from affecting the operation of the spraying device.

Another object of our invention is to provide a spraying device by which there will be produced a spray in which the particles are thoroughly separated and dispersed in a cone in a uniform manner by the pressure on the liquid only, and with a minimum loss from friction and eddy currents.

With these and other objects in view, our invention consists of certain novel features of construction, combination and arrangement of parts as will be more fully described and pointed out in the appended claims.

In the drawings, Figure 1 is a side elevation and Fig. 2 an end elevation of one form embodying our invention; Fig. 3 is a vertical section of Fig. 1, and Fig. 4 is an end view of Fig. 3 with the upper part a section on line 4—4 of Fig. 3 with the tip removed; Fig. 5 is a side view of the nozzle and Fig. 6 a bottom view of Fig. 5; Fig. 7 is a top view, Fig. 8 a side view, Fig. 9 a bottom view and Fig. 10 a vertical section on line 10—10 of Fig. 9, of the tip used in the form illustrated in Figs. 1, 2 and 3, and Fig. 11 is an enlarged vertical section of this same form, showing the several parts assembled; Figs. 12 and 13 are, respectively, side and front elevations of another form of our invention; Fig. 14 is a vertical section of Fig. 12 and Fig. 15 is a front elevation, partly in section, of Fig. 14, the section being taken on line 15—15 with the tip removed; Figs. 16 and 17 are, respectively, the side and bottom views of the nozzle used in the form illustrated in Figs. 12 and 14, and Figs. 18, 19 and 20 are, respectively, a side view, a bottom view and a vertical section of the tip used in the form illustrated in Figs. 12 and 14, and Fig. 21 is an enlarged vertical section showing the parts in assembled position. Similar reference numerals indicate similar parts in the several views.

Referring to the form of our invention, shown in Figures 1 to 11, inclusive, 20 is the nozzle member attached by screw threads to the end of a supply pipe 21. This nozzle member is provided with a central chamber 22 to which fluid is supplied by the pipe 21. Against the end of the nozzle member 20 is located a tip 23 provided externally, in the form illustrated, with a conical projection 24, a circular flange 25, a conical top portion 26 and a cylindrical portion 27. The end of the nozzle member 20 is recessed to receive the projection 24 on the tip, and a cap 28 screw-threaded to the nozzle member 20 is shaped to fit the flange 25 and the top portion of the tip 23 to hold it in place.

The tip has a central chamber 29 in which preferably, in the form illustrated, is located a projection 30 formed on the nozzle 20, this projection 30 serving to center the tip on the nozzle and also to shorten the central chamber 29. The tip is provided with an orifice 31, and the central chamber 29 is provided with conical walls 32 leading to the orifice 31.

Extending tangentially from the central chamber 29 are a plurality of ducts 33 which connect an annular recess 34 formed in the end of the nozzle 20 with the central chamber 29, these ducts being arranged as shown best in Figures 7 and 9, so that fluid passing therethrough is delivered tangentially to the central cavity 29. These ducts are also preferably directed toward the orifices 29 at an angle to the axis of the orifice, as shown best in Fig. 10.

In operation, oil under pressure is supplied through the pipe 21 to the cavity 22 from which it flows through suitable ducts 35 to the annular cavity 34. From here it passes through the ducts 33 into the central chamber 29 and, by reason of the direction and location of the ducts 33, the fluid is not only given a whirling motion around the axis of the orifice 29, but is also directed toward that orifice so as to follow a spiral path as the fluid travels toward the orifice 31, thus obviating the resistance due to a sudden change of direction which would be set up if the ducts 33 were not directed toward the orifice. The conical walls 32 provide a smooth and uniform path for the fluid particles as they travel from the cylindrical walls of the central chamber 29 to the orifice 31. Preferably, the ducts 33 are so designed in relation to the size of the orifice 31 as to provide for less resistance in the ducts than is set up by the orifice. This insures a constant and uniform pressure at the orifice so that the velocity of the fluid particles is not reduced as they pass through the tip.

In the form shown in Figures 12 to 21, inclusive, in which the parts in general resemble the form just described, 50 is a nozzle member having a cavity 52 and attached to a feed pipe 51. A tip 53 is centrally located on the nozzle 50 by the member 60 formed on the nozzle member, which projects into and fits a cavity in the bottom of the tip. The tip is held in place by a cap 58 screw-threaded to the nozzle 50 and recessed so as to engage the upper surface of the tip 53. An annular cavity 64 is formed in the end of the nozzle and communicates with the cavity 52 through ducts 65. An orifice 61 is formed in the end of the tip 53 and directly behind it is formed a central cavity 59 having conical walls 62. Ducts 63 connect the annular cavity 64 with the central cavity 59, these ducts being arranged in a manner similar to that of the first form of our invention described herein, these ducts being tangential to the central cavity 59 and also extending toward the orifice 61 at an angle thereto.

The fluid passes through the ducts 65 to the annular cavity 64 and from thence through the ducts 63 to the chamber 59 and thence out of the orifice 61, the direction and location of the ducts 63 giving a high whirling velocity to the fluid and also a motion toward the orifice 61.

It will be understood that in both the forms of our invention, which we have chosen for purposes of illustration, the fluid passes out of the orifice at high velocity and with a whirling motion so that the fluid is broken up into a uniform cone of spray, the angle of which will be determined by the proportions of the several parts. In both forms illustrated the fluid follows a uniform and definite path which is entirely contained within the tip member, so that the form of cone of spray will not be varied by accidental shifting of the several parts.

While we have illustrated and described the ducts 33 and 63, in our preferred forms, as tangential to the periphery of the central chamber, it should be understood that these ducts may be tangential to a circle smaller than the periphery of the chamber and that, in the appended claims, when we describe these ducts as tangential to the central chamber, we mean to include any arrangement in which the ducts are tangent to some circle having the center of the chamber as its center.

While we have herein shown and described two embodiments of our invention, we do not desire to be limited to the exact arrangement shown and described, but seek to cover, in the appended claims, all those modifications which come within the true spirit and scope of our invention.

We claim:—

1. In a spraying device, a nozzle and a tip removably secured to said nozzle, said tip having a discharge orifice and a central chamber with smooth continuous walls behind the orifice, and a plurality of ducts connecting said nozzle with said central chamber, and adapted to deliver liquid tangentially to said chamber, said nozzle being provided with a projection adapted to enter a cavity in said tip and contact closely with the walls of said cavity to position said tip on said nozzle.

2. In a spraying device, a nozzle and a tip removably secured to said nozzle, said tip having a discharge orifice and a central chamber with smooth continuous walls behind the orifice, and a plurality of ducts connecting said nozzle with said central chamber, and adapted to deliver liquid tangentially to said chamber and toward said orifice at an angle to the axis thereof, said nozzle being provided with a projection adapted to enter a cavity in said tip and contact closely with the walls of said cavity to position said tip on said nozzle.

3. In a spraying device, a nozzle and a tip removably secured to said nozzle, said tip having a discharge orifice and a central chamber with smooth continuous walls behind the orifice, and a plurality of ducts connecting said nozzle with said central chamber, and adapted to deliver liquid tangentially to said chamber, said nozzle being provided with a projection adapted to enter a cavity in said tip and contact closely with the walls of said cavity to position said tip on said nozzle, and a cap removably connected to said nozzle and adapted to engage said tip to hold said tip in place.

NORMAN HUBBARD.
THOMAS B. STILLMAN.